US012502851B2

(12) United States Patent
Passini et al.

(10) Patent No.: US 12,502,851 B2
(45) Date of Patent: Dec. 23, 2025

(54) HYBRID TOOLING STRUCTURES OF ADDITIVELY MANUFACTURED THERMOPLASTICS REINFORCED WITH RIGID METAL SUPPORTS AND METHODS FOR THE DESIGN AND MANUFACTURE THEREOF

(71) Applicant: EMBRAER S.A., São José dos Campos—SP (BR)

(72) Inventors: Adriano Passini, São José dos Campos—SP (BR); Adriano José De Lima, São José dos Campos—SP (BR); Leandro Oliveira Renó, São José dos Campos—SP (BR)

(73) Assignee: EMBRAER S.A., São José dos Campos—SP (BR)

( * ) Notice: Subject to any disclaimer, the term of this patent is extended or adjusted under 35 U.S.C. 154(b) by 142 days.

(21) Appl. No.: 18/172,039

(22) Filed: Feb. 21, 2023

(65) Prior Publication Data

US 2024/0278511 A1    Aug. 22, 2024

(51) Int. Cl.
*B29C 70/54* (2006.01)
*B29C 33/38* (2006.01)
(Continued)

(52) U.S. Cl.
CPC .......... *B29C 70/54* (2013.01); *B29C 33/3842* (2013.01); *B29C 70/44* (2013.01); *B33Y 80/00* (2014.12)

(58) Field of Classification Search
CPC ... B29C 33/301; B29C 33/38; B29C 33/3842; B29C 33/40; B29C 70/44; B29C 70/54; B33Y 80/00; E04F 15/02458
See application file for complete search history.

(56) References Cited

U.S. PATENT DOCUMENTS

| | | | | |
|---|---|---|---|---|
| 4,822,272 A | * | 4/1989 | Yanase | B29C 33/38 425/436 R |
| 4,863,663 A | * | 9/1989 | Nico, Jr. | B29C 70/30 264/258 |

(Continued)

FOREIGN PATENT DOCUMENTS

| | | |
|---|---|---|
| CN | 210755166 | 6/2020 |
| WO | 2020/096951 | 5/2020 |

OTHER PUBLICATIONS

ASTM F2792-12a, Standard Terminology for Additive Manufacturing technologies, ASTM International (2013).

(Continued)

*Primary Examiner* — Yunju Kim
(74) *Attorney, Agent, or Firm* — NIXON & VANDERHYE P.C.

(57) ABSTRACT

Hybrid tooling structures are provided which include an additively manufactured thermoplastic tooling unit defining a tooling surface for receiving and supporting a component part to be manufactured, and a rigid metal support member fixed to the tooling unit. The rigid metal support member may be internally provided as an integral part of the additively manufactured tooling unit (e.g., the integral support member serving as an endoskeletal support structure for the tooling unit) which is especially adapted for high temperature/pressure processing conditions or may be externally provided as a support frame to which the additively manufactured tooling unit is fixedly attached (e.g., the frame serving as an exoskeletal support structure for the tooling unit) which is especially adapted for ambient room temperature/pressure and loads during processing conditions.

12 Claims, 17 Drawing Sheets

(51) Int. Cl.
 *B29C 70/44* (2006.01)
 *B33Y 80/00* (2015.01)

(56) References Cited

U.S. PATENT DOCUMENTS

| | | |
|---|---|---|
| 11,235,378 B2 | 2/2022 | Yang et al. |
| 2005/0173839 A1* | 8/2005 | Crump ................ B29C 33/3842 |
| | | 264/401 |
| 2006/0145049 A1* | 7/2006 | Blankinship ............ B29C 70/32 |
| | | 249/66.1 |
| 2009/0236044 A1* | 9/2009 | Gallana Blanco ...... B29C 70/44 |
| | | 156/349 |
| 2016/0354843 A1 | 12/2016 | Lacy et al. |
| 2017/0173896 A1* | 6/2017 | Stauffer .................. B29C 33/76 |
| 2018/0236638 A1* | 8/2018 | Olberg ..................... B25H 1/18 |
| 2019/0022760 A1 | 1/2019 | Coskun et al. |
| 2019/0082823 A1* | 3/2019 | Applegate ............ A47B 13/003 |
| 2020/0290241 A1 | 9/2020 | Gunner et al. |
| 2022/0064965 A1* | 3/2022 | Huss ....................... E04F 19/02 |

OTHER PUBLICATIONS

ULTEM™9085 Resin, www/Stratasys.com/en/materials/materials-catalog/fdm-materials/ultem-9085/, Stratasys Materials (2022).

\* cited by examiner

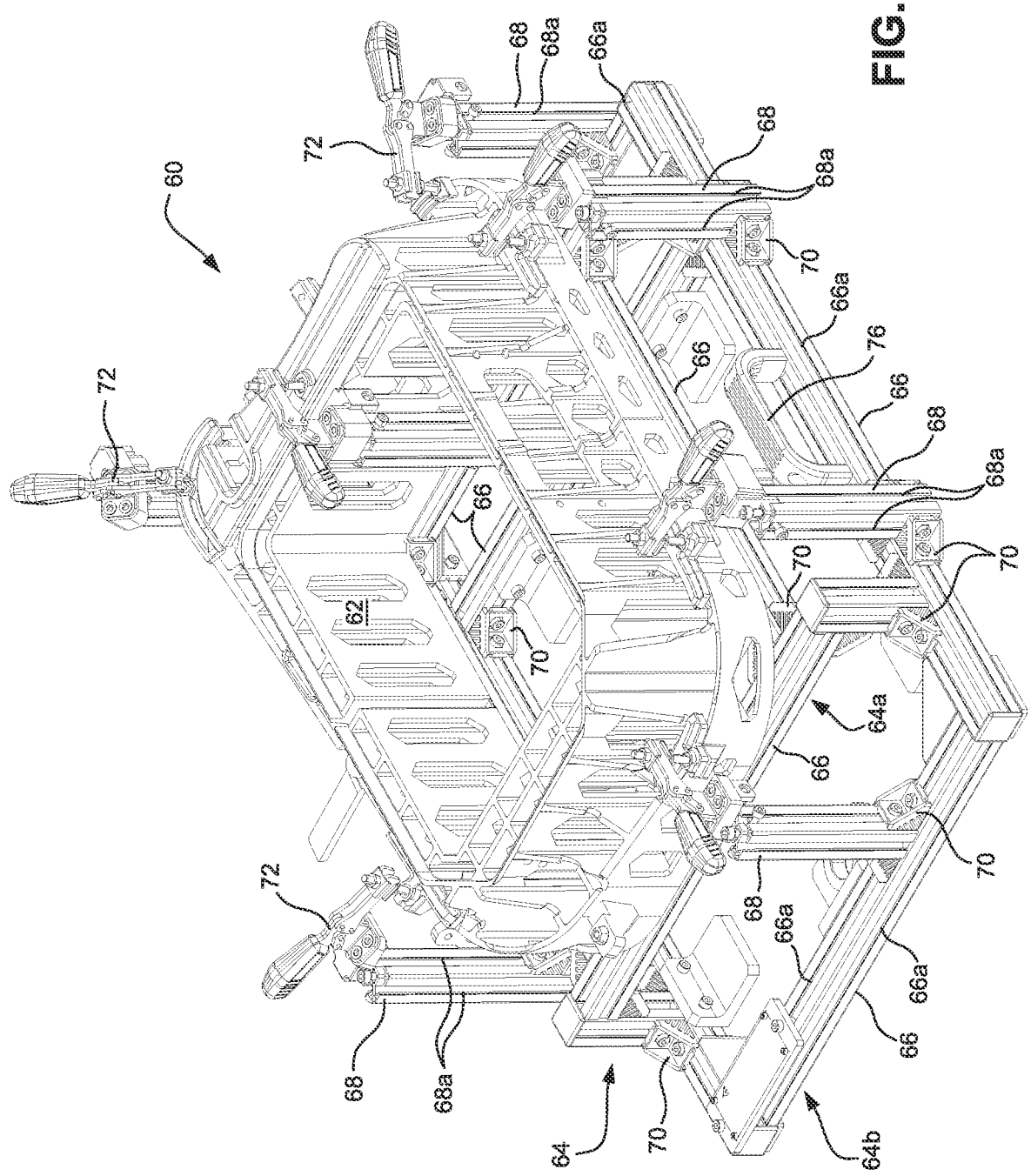

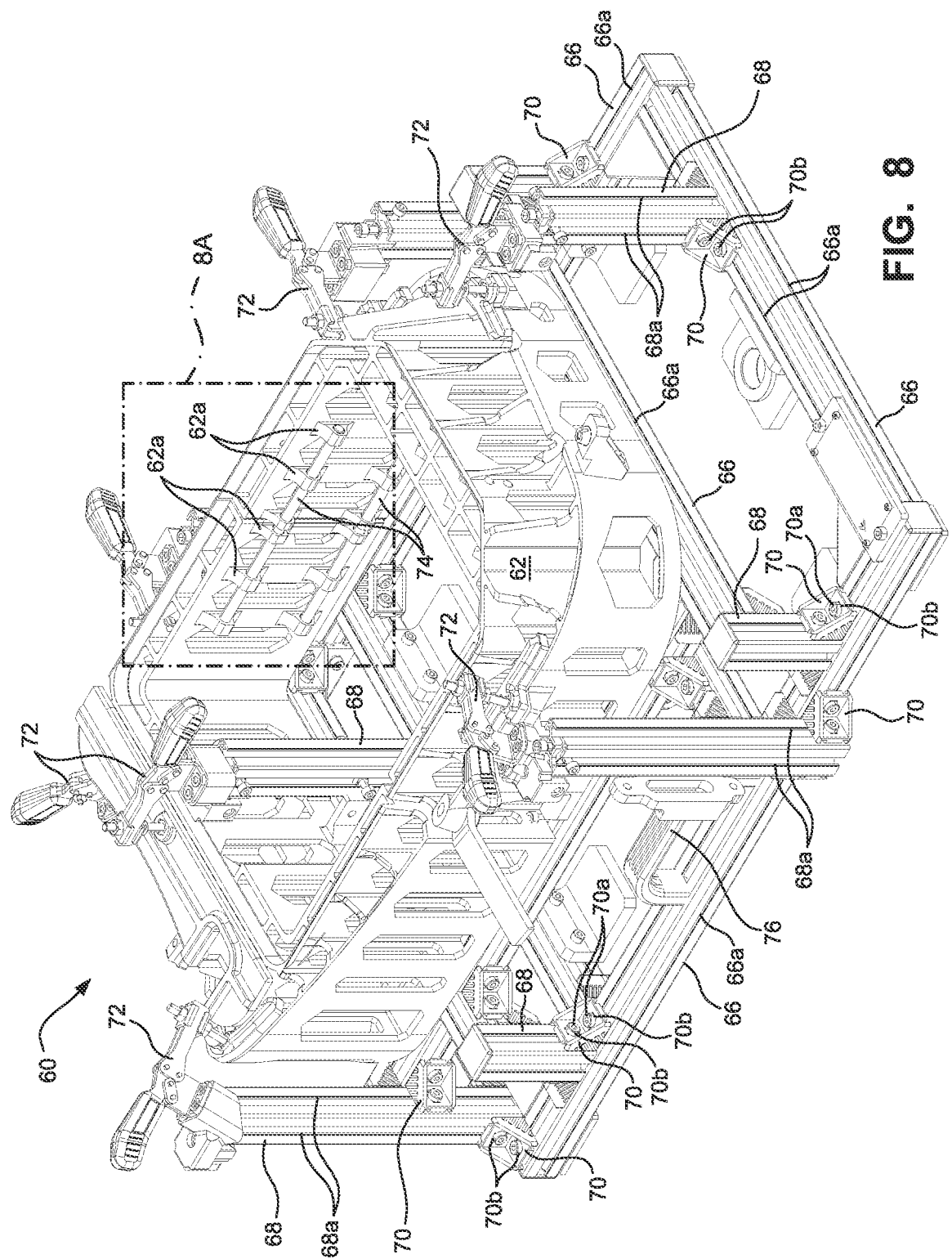

HYBRID TOOLING STRUCTURES OF ADDITIVELY MANUFACTURED THERMOPLASTICS REINFORCED WITH RIGID METAL SUPPORTS AND METHODS FOR THE DESIGN AND MANUFACTURE THEREOF

FIELD

The embodiments disclosed herein relate generally to tooling structures that may be employed industrially to fabricate finished component parts formed of e.g., metal, plastics and reinforced composite materials. In especially preferred forms, the embodiments disclosed herein relate to hybrid tooling structures having a tooling unit formed by thermoplastic additive manufacturing techniques and a reinforcement member formed of a rigid metal member fixed to the tooling unit.

BACKGROUND

The state of the art in design and manufacturing of tooling for fabricating component parts has a high development cycle thereby increasing the costs attendant to such design and manufacturing. High cycle development of the tooling in turn deleteriously leads to increased costs for the finished fabricated component and decreased financial results for component manufacturers. By way of example, some of the technical problems attendant with the design and manufacturing of tooling for fabricating component parts include:

- Careful attention to all structural, thermal and dimensional requirements for any step in the manufacturing processes such as curing in autoclave, machining and the like.
- High cycle of tooling development from design to manufacturing.
- Increased safety and ergonomics.
- Implementation of the concept for design for maintenance.

Additive manufacturing technology is allowing new techniques by which tooling, molds or any kind of devices may be made. For example, CN 210755166U[1] describes methods to produce a machining device that contemplates additive manufacturing and machining in the same equipment. Also the publication WO2020/096951 describes methodologies and systems to construct a shaping structure and a three-dimensional object therein in a hybrid process employing a variety of manufacturing methods. The shaping structure is essentially a mold, preferably a shell that is constructed additively to generate a series of shaping cavities. Patent Application Publication US2019/022760 describes methods for preparing a hybrid article which include disposing an additive structure comprising a plurality of layers on a build surface of a part. Further U.S. Pat. No. 11,235,378 describes a method of building an additively manufactured casting core-shell hybrid mold with ceramic shell while US Patent Application Publication US2016/0354843 describes a hybrid additive manufacturing method which comprises building an additive structure on a pre-sintered preform base. Patent Application Publication 2020/0290241 further describes techniques for producing panels, such as for use in a vehicle, boat, aircraft or other transport structure or mechanical structure using a 3-D printed tooling shell.

[1] The contents of this publication and all other publications referenced below are expressly incorporated hereinto by reference.

Composite parts need some form of a tooling structure to give the final part its shape and ensure the required dimensional and structural requirements are met. Most composite parts are cured inside an autoclave, the most critical environment for which is about 100 psi of pressure and 180° C. temperature. There are also many applications tooling structures are needed to form parts at room temperature (e.g., 20° C.). For such room temperature applications, the tooling structure is typically a device that supports the part after the curing process whereby it is not necessary to use a shape conforming model to manufacture the part. For example, the cured composite part may need to be machined because of the dimensional requirements of the edges and holes. The part will thus receive forces of the cutting tool that a manufacturing robot applies during the processes, such as forces between 90 and 100 N. The current tooling structures for such purposes tend to be very rigid, heavy for manual handling and large so as to support such a load.

While the proposals in the art may be sufficient for certain applications, there is a continual need for improvement. Therefore, it would be highly desirable if tooling could be provided in a cost-effective manner by thermoplastic additive manufacturing techniques yet sufficiently structurally robust to withstand many component manufacturing steps, e.g., autoclave curing, machining and the like. It is towards fulfilling such needs that the embodiments described herein are directed.

SUMMARY

Generally, the embodiments disclosed herein are directed toward tooling structures that include a tooling unit made by additive manufacturing techniques and reinforced with one or more rigid metal reinforcement member, such as rigid metal tubes, profile beams, rods, support scaffolding and the like. The additively manufactured polymeric tooling unit defines a tooling surface that supports and gives form to the final component parts being manufactured while the metal reinforcement members receive the pressure loads of the processing to form such final component parts.

The additive manufacturing techniques to make the tooling units can therefore decrease the manufacturing time because it is no longer necessarily required to provide complementary processes to give the final conformity in the tooling, like machining, thermal treating, and dimensional inspection in some cases. According to the embodiments disclosed herein, the rigid metal reinforcement members can provide an internal structural skeleton to support and structurally reinforce the additively manufactured tooling unit or may be a rigid metal exoskeleton to which the additively manufactured tooling unit is affixed to thereby support and structurally reinforce the tooling unit.

According to some embodiments therefore, hybrid tooling structures are provided which include an additively manufactured thermoplastic tooling unit defining a tooling surface for receiving and supporting a component part to be manufactured, and a rigid metal support member fixed to the tooling unit.

The rigid metal support member may be internally provided as an integral part of the additively manufactured tooling unit (e.g., the integral support member serving as an endoskeletal support structure for the tooling unit) which is especially adapted for high temperature/pressure processing conditions or may be externally provided as a support frame to which the additively manufactured tooling unit is fixedly attached (e.g., the frame serving as an exoskeletal support structure for the tooling unit) which is especially adapted for ambient room temperature/pressure processing conditions. Thus, the additively manufactured thermoplastic tooling unit may therefore include an additively manufactured base beam which defines at least one channel therein, and wherein the rigid metal support member comprises an elongate rigid metal support member received within the channel of the support beam. Alternatively (or additionally), the additively manufactured tooling unit may be fixed to interconnected modular rigid elongated beams forming a rigid support frame assembly.

In those embodiments whereby the additively manufactured base beam defines at least one channel therein, the elongate rigid metal support member may be adhesively bonded to the tooling unit within the channel of the support beam. The base beam may be a one-piece (unitary) part of the tooling unit or may be split along a parting line to establish upper and lower parts of the base beam, in which case the upper and lower parts of the base beam are secured to one another by a series of bolt/nut assemblies. The upper and lower parts of the base beam may include a series of apertured split connection lobes such that the bolt/nut assemblies are received by respective ones of the connection lobes to secure the upper and lower parts of the base beam to one another.

In those embodiments which include an external support member, the frame assembly may itself include upper and lower subframe assemblies formed by an interconnected plurality of the elongate support beams with a plurality of upright rigid metal support posts being connected to the upper and lower subframe assemblies so as to separate the upper and lower subframe assemblies from one another. A plurality of additively manufactured thermoplastic tooling units each defining a tooling surface may be fixed to the upper subframe assembly.

Each of the support beams and posts of the upper and lower subframe assemblies may have a rectangular cross-section and define elongate slots in each side surface thereof. The upper and lower subframe assemblies may also further comprise a plurality of corner brackets, and a plurality of T-head bolt and flange nut assemblies. The T-head bolt may be operatively received within a corresponding slot of a respective support beam with a threaded shaft thereof extending through an aperture of a corner bracket, with the flanged nut being threadably coupled to the threaded shaft so as to rigidly connect the corner bracket to the respective support beams and/or support posts. The upper and/or lower support frame subassembly may have at least one handle to allow manual handling and/or transport of the tooling structure during the component manufacturing process.

The upper subframe assembly may also comprise one or more clamp member to clamp the tooling unit to the upper subframe assembly and/or one or more clamp assembly to clamp a component part onto the tooling surface of the tooling unit. If provided, the clamping assembly may be provided with a threaded support connected to a support beam of the upper support frame subassembly, a threaded shaft threadably connected to the threaded support and a clamp foot at a terminal end of the threaded shaft to apply clamping pressure against the component part.

In use, a preform of the component part may be associated with the tooling surface of the tooling unit (e.g., the application or laying up of successive number of layers of a prepreg material comprised of a fiber-reinforced curable resin to form the preform of the component part from the prepreg material). The tooling structure with the associated component preform thereon may then be subjected to component processing (e.g., subjecting the tooling structure with the component preform thereon to elevated temperature and pressure conditions (e.g., temperatures of up to about 180° C. and pressures of about 100 psi in an autoclave) to cure the resin of the prepreg material).

These and other aspects and advantages of the present invention will become clearer after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

FIGS. 7 and 8 are right and left front perspective views of yet another embodiment of an exemplary hybrid tooling structure according to the invention;

DETAILED DESCRIPTION OF EMBODIMENTS

Figure 1:
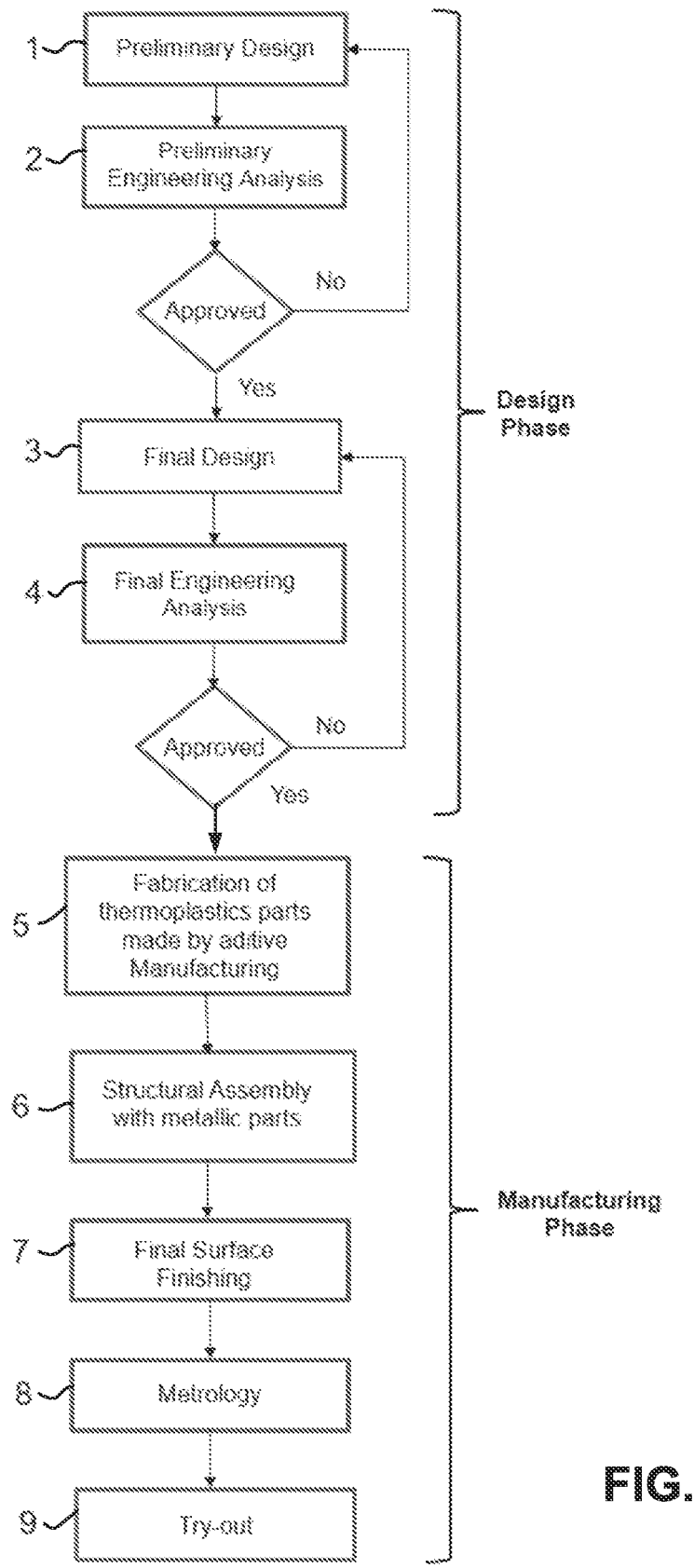
FIG. 1 is a flow chart diagram showing the developmental steps in forming the hybrid tooling structures according to the embodiments described herein.

Accompanying FIG. 1 depicts a flow diagram of the steps involved in development of a suitable tooling structure according to the embodiments described herein. In this regard, a preliminary design of the tooling will be conducted in step 1 whereby all the functionalities are defined along with the requirements for the tooling structure. Preliminary stress and/or thermal analyses are then made in step 2 to validate if the functionalities and requirements are sufficient to proceed with the final design and engineering analyses conducted in steps 3 and 4. During step 3, therefore, final design and complete definition of the tooling structure is completed along with 3D computer assisted modeling.

After approval of the final engineering analyses in step 4, the manufacturing phase for the tooling structure can be started with the fabrication of the additive manufactured tooling unit in step 5 using suitable thermoplastic materials, e.g., acrylonitrile-butadiene-styrene (ABS) polymer, polyetherimide (PEI) thermoplastic polymers (e.g., ULTEM™ 9085 PEI resin commercially available from Stratasys, Inc.).

By "additive manufacturing", "additive manufactured" and like terms are industry standard terms per ASTM F2792 (the entire content of which is expressly incorporated hereinto by reference. Such terms thereby embrace various manufacturing and prototyping techniques known colloquially by a number of names, such as freeform fabrication, 3D printing (including successive layer by layer 3D laser sintering of thermoplastic powders), rapid prototyping/tooling, fused deposition modeling (FDM®) and the like using computer aided design (CAD) models. Fused deposition modeling may thus be employed whereby material filaments, such as PEI filaments, on spools are placed on one or more spool holders such that the filaments may be fed into an extruder apparatus. In operation, the extruder apparatus heats the filament into a melted form before ejecting the material to form a layer of the tooling structure.

In step 6, the metal reinforcing members are assembled with the additive manufactured tooling unit followed by any finishing/polishing or additional surface modification of the additive manufactured tooling unit. Final dimensional inspection of the assembled tooling structure may the occur in step 8 followed by an actual try-out under high pressure and temperature conditions of e.g., an autoclave to ensure all components function satisfactorily in such an environment.

Figure 2:
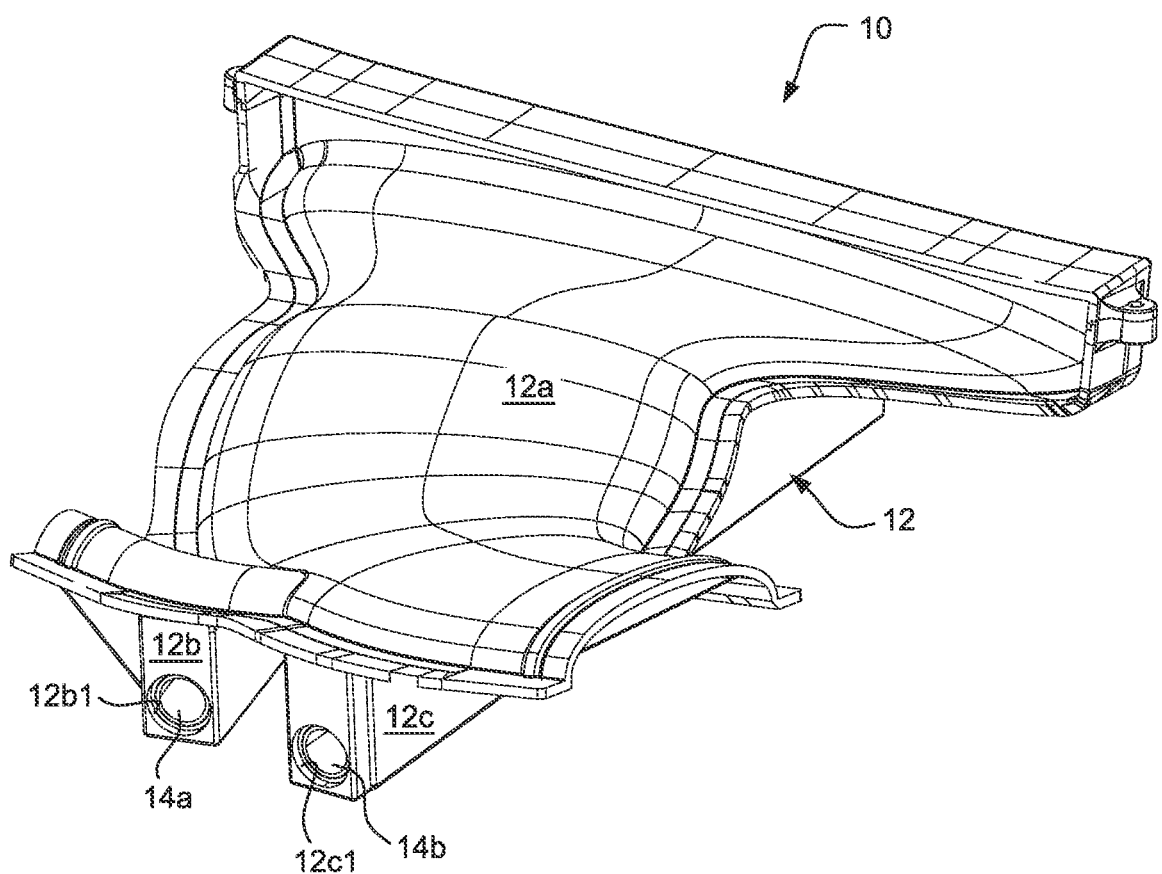
FIG. 2 is a perspective view of an exemplary hybrid tooling structure in accordance with an embodiment of the invention.
Figure 3:
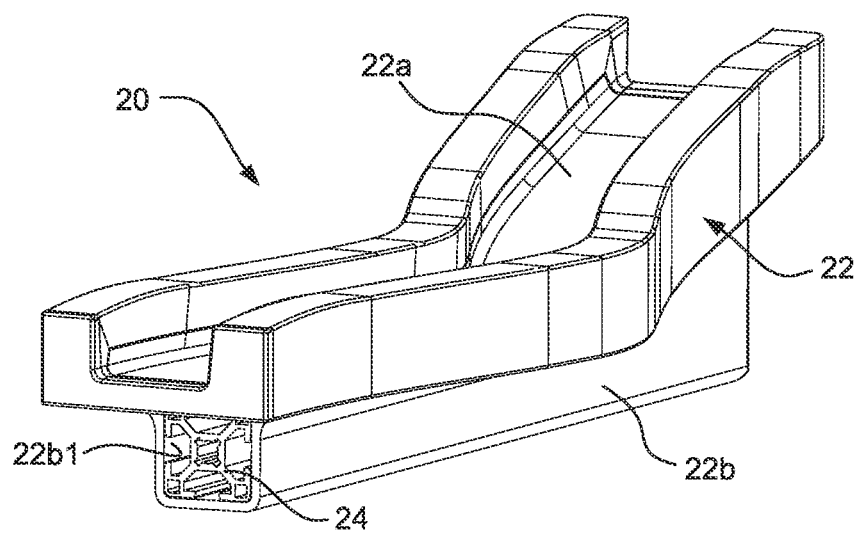
FIG. 3 is a perspective view of another exemplary embodiment of a hybrid tooling structure in accordance with the invention.
Figure 4:
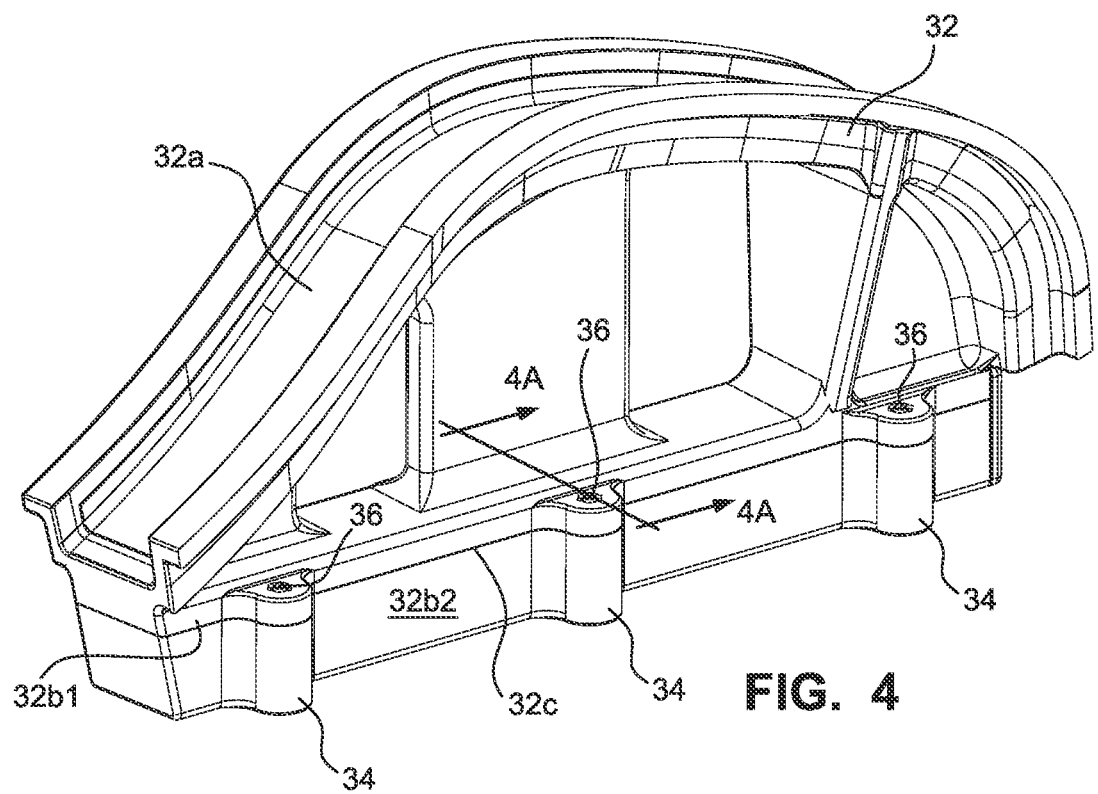
FIG. 4 is a perspective view of yet another embodiment of an exemplary hybrid tooling structure according to the invention.
Figure 4A:
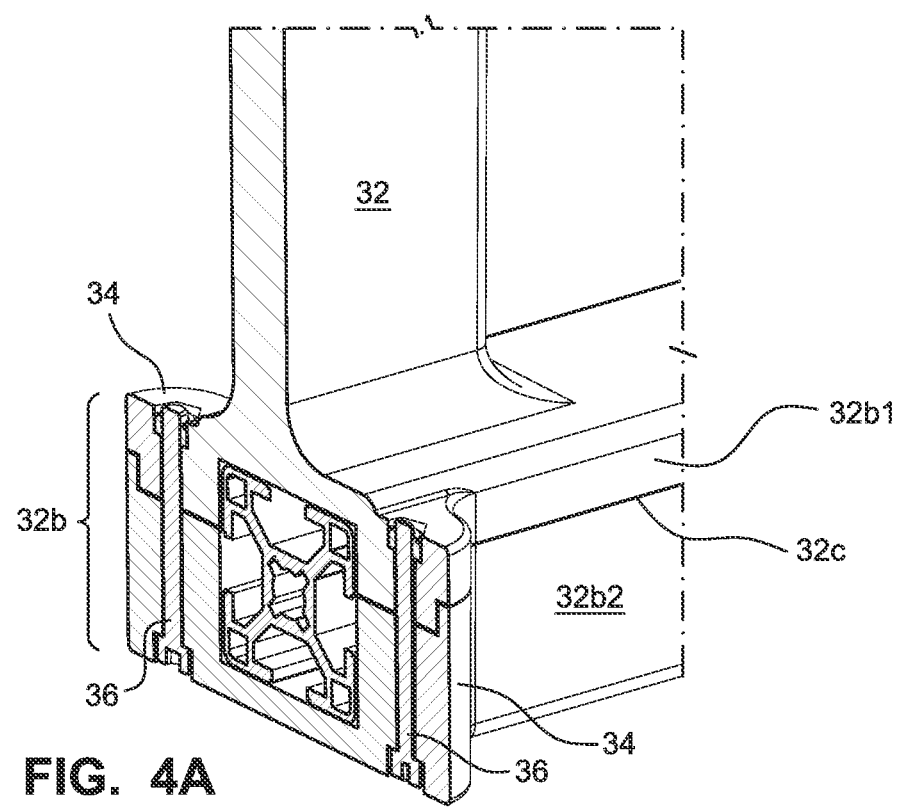
FIG. 4A is a cross-sectional view of the hybrid tooling structure shown in FIG. 4 as taken along lines 4A-4A therein.

Accompanying FIGS. 2-4 show exemplary embodiments of hybrid tooling structures that are especially adapted for fabricating relatively complex composite parts formed of cured fiber-reinforced resin materials under the relatively high pressure and temperature conditions of an autoclave. In this regard, the hybrid tooling structure 10 shown in FIG. 2 includes an additively manufactured thermoplastic tooling unit 12 which is structurally reinforced by rigid tubular metal support members 14a, 14b. The additively manufactured thermoplastic tooling unit 12 defines a contoured tooling surface 12a on which successive layers of prepreg plies of fiber reinforced uncured resin may be laid-up to provide a preform of the component part. The fibers may be made of, but are not limited to fibers formed of fiberglass, carbon, boron, aramid and the like. The adhesive matrix of the prepreg fiber layers may be made of, but are not limited to, epoxy or other adhesive polymers. The entire hybrid tooling structure 10 with the successive layers of prepreg plies laid up on the tooling surface 12a may then be subjected to autoclave curing to thereby cure the resin of the prepreg plies and form a component part that may not necessarily require further processing, e.g., trimming, drilling, surface fishing (smoothing) or the like.

As shown in FIG. 2, the additively manufactured tooling unit 12 includes unitary (one piece) base beams 12b, 12c that extend lengthwise along the bottom of the tooling surface 12a. Each of the base beams 12b, 12c is formed with an elongate cylindrical channel 12b1, 12c1 configured to receive therewithin the rigid tubular metal support members 14a, 14b, respectively. The metal support members may be physically inserted into the channels 12b1, 12c1, respectively, following formation of the additively manufactured tooling unit. Each of the metal support members 14a, 14b is preferably adhesively bonded to the interior surfaces of the respective cylindrical channel 12b1, 12c1 by means of a suitable bonding adhesive (e.g., epoxy adhesive) that is adapted to rigidly bond metal to thermoplastic materials. Thus, the bonding adhesive may be applied to the metal support members 14a, 14b and/or within the channels 12b1, 12c1 before the former are inserted into the latter. Upon curing of the adhesive, therefore, the metal support members 14a, 14b become an integral component part of the additively manufactured tooling unit 12. The hybrid tooling structure 10 is thereby capable of withstanding the both the high temperature and pressure conditions of the autoclave curing process.

Figure 3A:
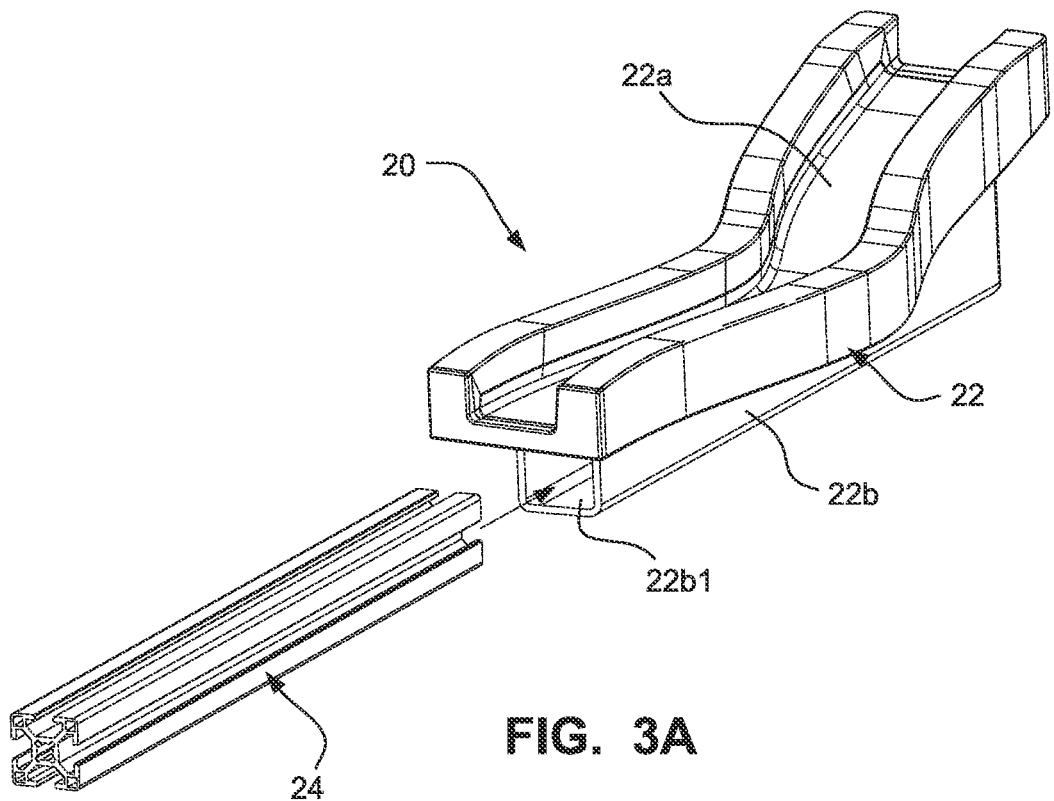
FIG. 3A is an exploded perspective view of the hybrid tooling structure shown in FIG. 3.

FIGS. 3 and 3A depict another exemplary hybrid tooling structure 20 according to an embodiment of the invention. In the embodiment shown, the tooling structure 20 includes a one-piece additively manufactured thermoplastic tooling unit 22 that defines a contoured tooling surface 22a for receiving successive layers of prepreg plies and an integrally formed tubular base beam 22b extending the lengthwise extent of the tooling structure 20. In the embodiment of the tooling structure 20 depicted in FIGS. 3 and 3A, the tubular base beam is additively manufactured so as to be a rectangular (e.g., square) channel 22b1 which is adapted to receive therein the elongate metal profile beam 24. The profile beam 24 may be adhesively bonded to the interior surfaces of the base beam 22b by means of a suitable bonding adhesive (e.g., epoxy adhesive) that is adapted to rigidly bond metal to thermoplastic materials.

Figure 4B:
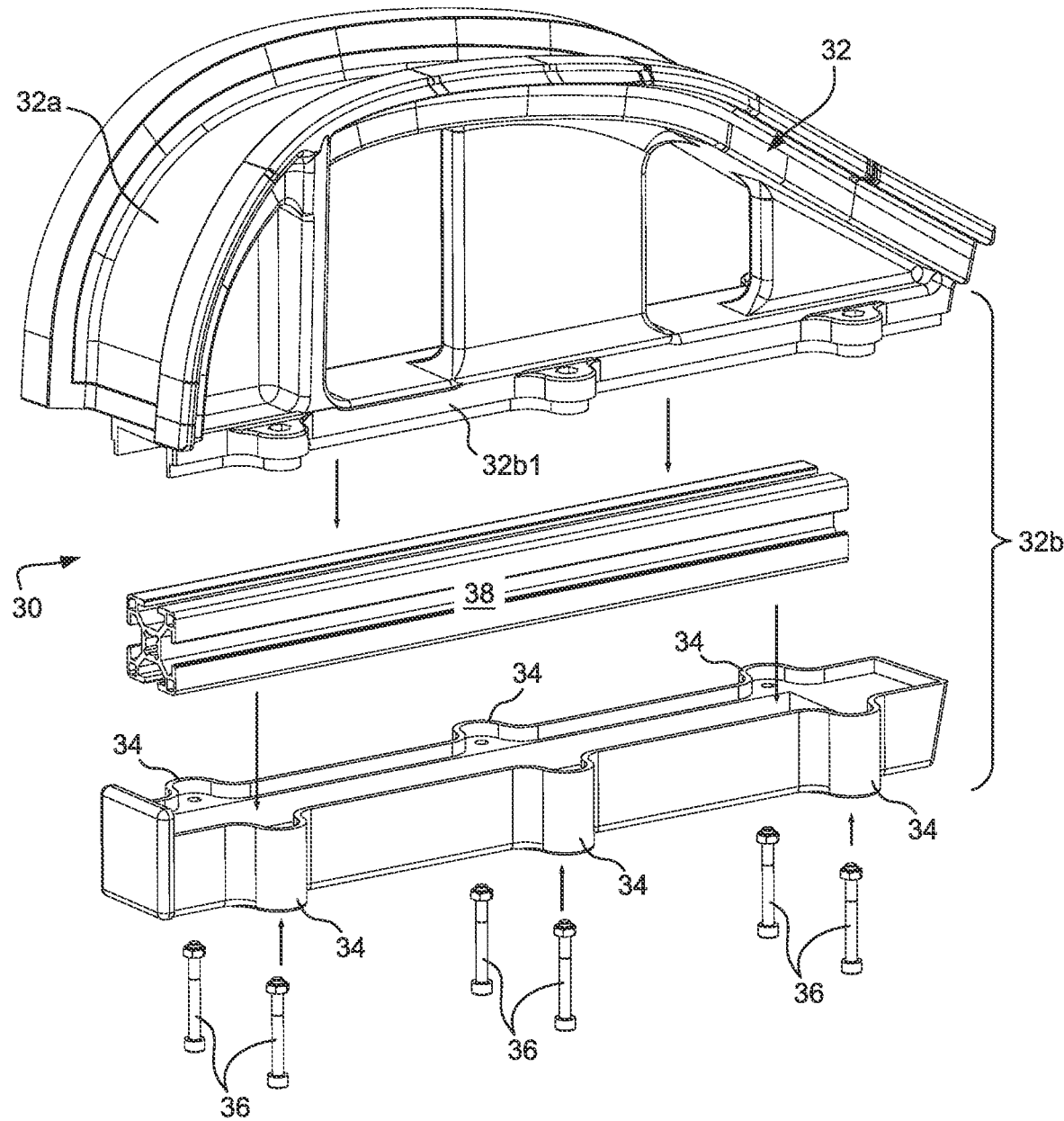
FIG. 4B is an exploded perspective view of the hybrid tooling structure depicted in FIG. 4.

FIGS. 4-4B depict yet another exemplary hybrid tooling structure 30 according to an embodiment of the invention. In the embodiment shown, the tooling structure 30 includes a two-piece additively manufactured thermoplastic tooling unit 32 which defines a contoured tooling surface 32a for receiving successive layers of prepreg plies. A tubular base beam 32b extends the lengthwise extent of the tooling structure 30 and is split along a horizontal plane at a parting line 32c to provide an upper part 32b1 which is unitarily joined to the tooling surface structures and a lower part 32b2. A series of apertured split connection lobes 34 are additively manufactured of thermoplastic material to receive a respective bolt/nut assembly 36 therein. The lower part 32b2 may thus be separated from the upper part 32b1 so as to allow a rigid metal profile support beam 38 to be positioned within a lower portion of the rectangular (square) channel 32c formed by the base beam 32b. The profile support beam 38 may be adhesively bonded to the interior surfaces of the channel 32c of the base beam 32b by means of a suitable bonding adhesive (e.g., epoxy adhesive) that is adapted to rigidly bond metal to thermoplastic materials. Once the support beam 38 is assembled with the lower part 32b2 of the base beam 32b, the lower and upper parts 32b2, 32b1, respectively may be immovably secured to one another via the bolt/nut assemblies 36 operably positioned within the apertured lobes 34.

While the embodiments of the hybrid tooling structures according to the invention discussed above in reference to FIGS. 2-4B are especially suitable for forming component parts that require the hybrid tooling to high temperature/pressure conditions, the embodiments of the hybrid tooling structures shown in FIGS. 5-10B are especially adapted for low or room temperature (e.g., about 20° C.) and ambient atmospheric pressure conditions. Thus, whereas the embodiments discussed above in reference to FIGS. 2-4B include an endoskeleton comprised of the elongate rigid metal support members which are physically inserted into and thus surrounded by correspondingly defined channels of the additively manufactured base beams associated with the thermoplastic tooling unit, the embodiments of FIGS. 5-10B to be discussed hereinbelow include additively manufactured thermoplastic tooling units that are connected to and supported by a rigid metal (preferably modular) support member as a structural exoskeleton.

Figure 5:
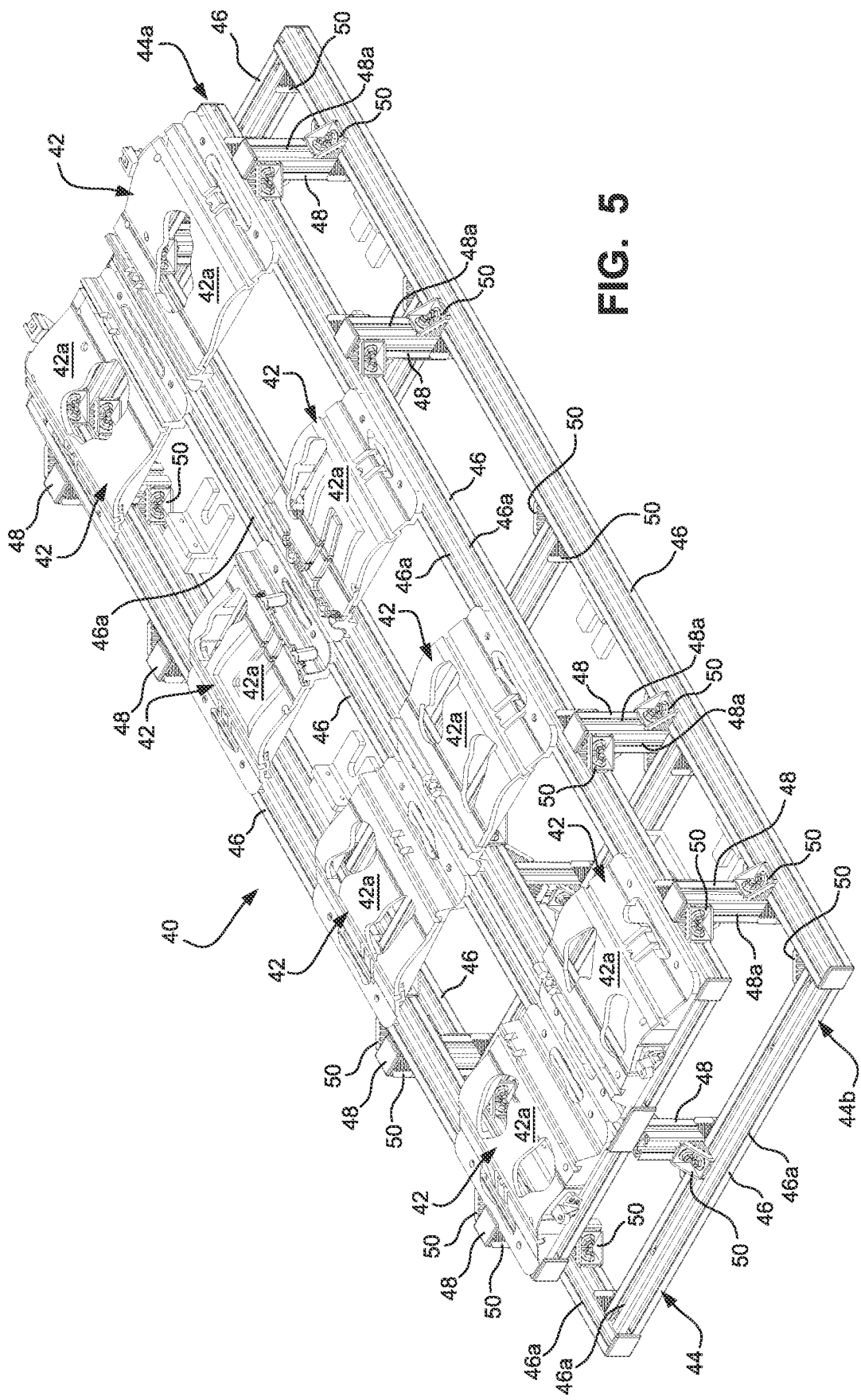
FIG. 5 is a perspective view of yet another embodiment of an exemplary hybrid tooling structure according to the invention.
Figure 6:
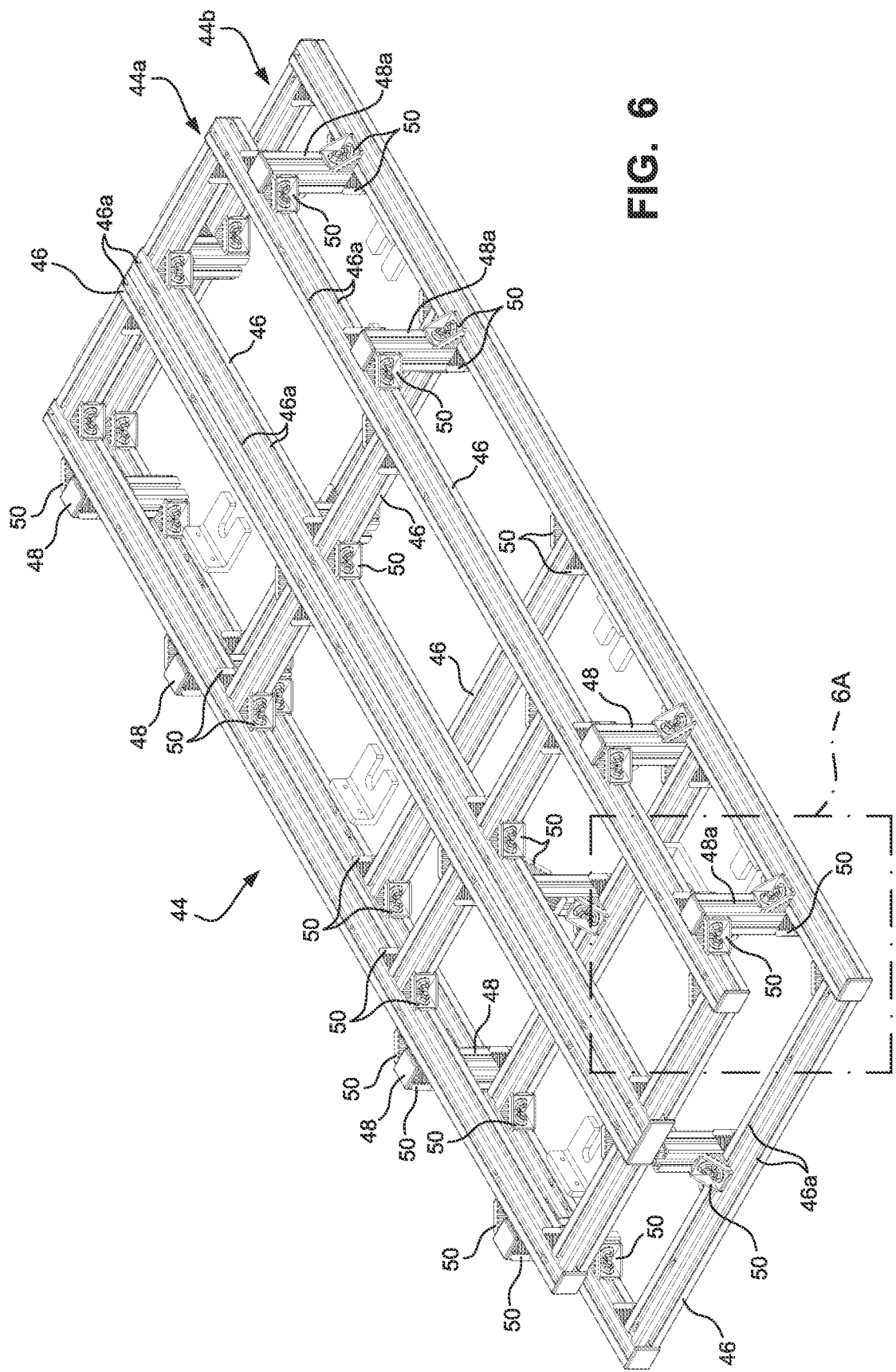
FIG. 6 is a perspective view of the modular rigid metal support member employed in the hybrid tooling structure of FIG. 5.
Figure 6A:
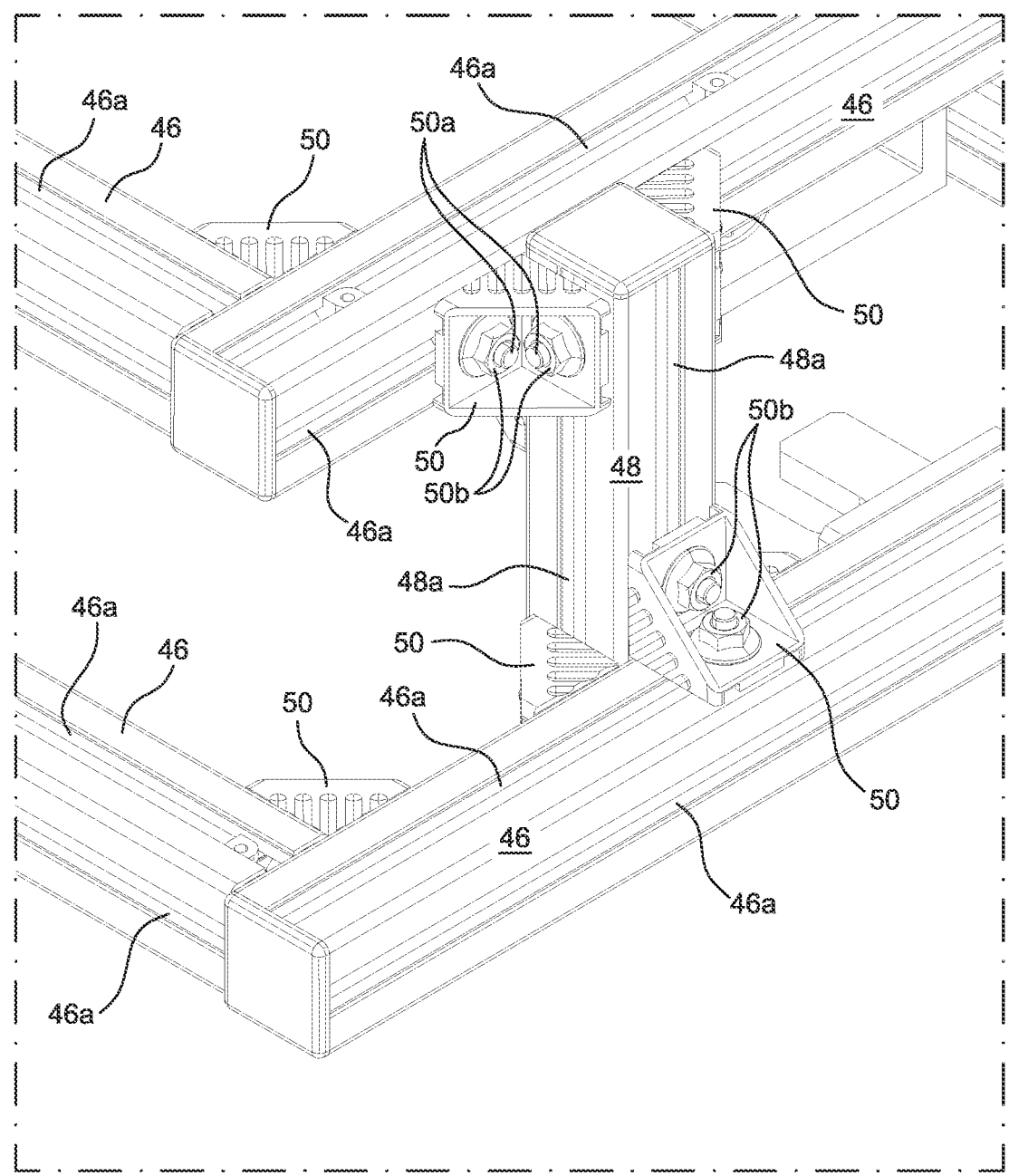
FIG. 6A is an enlarged perspective view of a portion of the modular metal support member shown in FIG. 6.
Figure 6B:
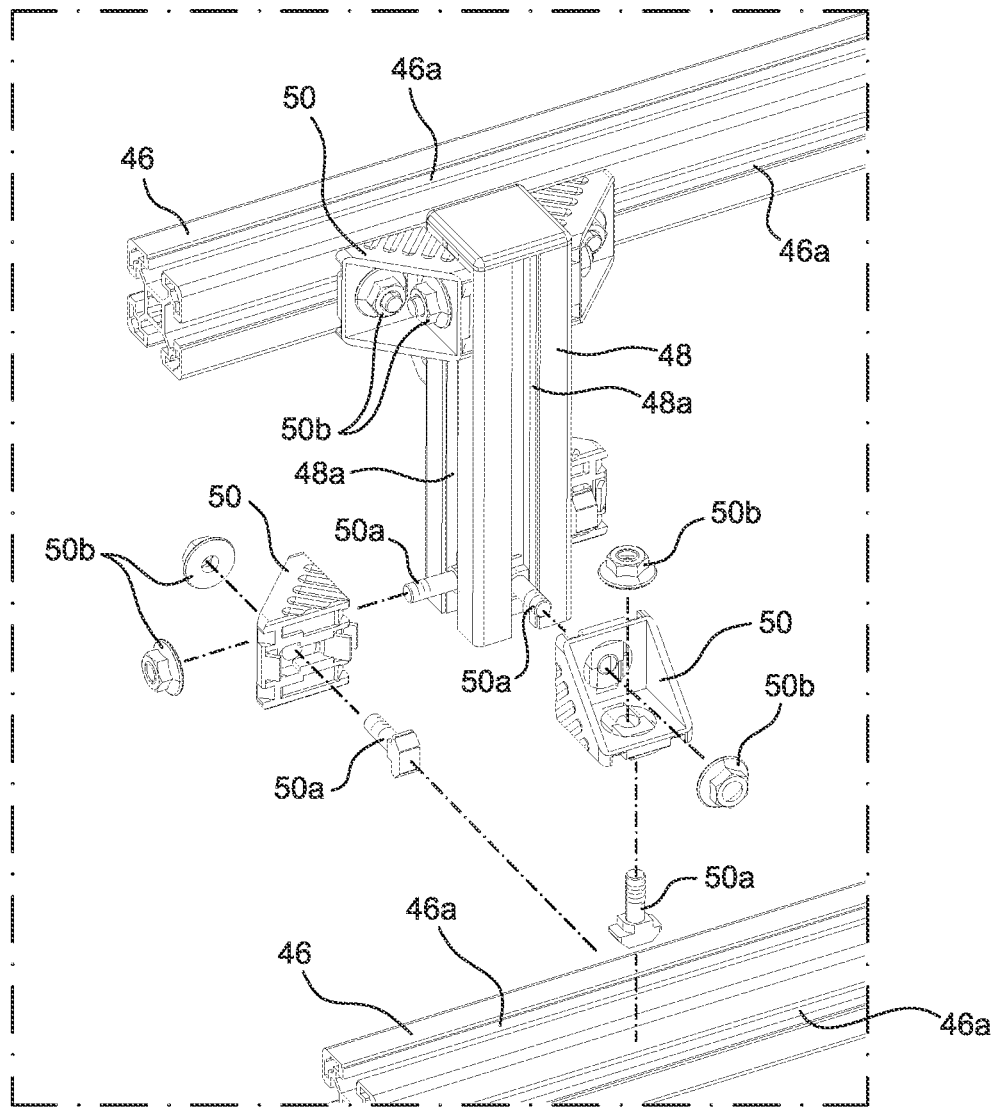
FIG. 6B is an enlarged exploded perspective view of exemplary modular components employed in the modular metal support member depicted in FIG. 6.

Accompanying FIGS. 5-6B depict one exemplary embodiment of a hybrid tooling structure 40 which includes a number of one-piece additively manufactured thermoplastic tooling units 42 secured to a modular metal support frame assembly 44. It will be observed in this regard, that the tooling units 42 depicted in FIG. 5 are shown with the contoured tooling surface 42a being partially sectioned for clarity of presentation so as to reveal components parts therebeneath, it being understood that the tooling surface 42a is continuous so as to support thereon a component part (not shown) being manufactured.

As is perhaps best shown by FIGS. 6A and 6B, the modular metal support frame assembly 44 is comprised of a number of rigid metal profiled beams 46 assembled to one another so as to form generally horizontally disposed parallel upper and lower support subframes 44a, 44b that are vertically separated from one another by similarly configured rigid metal support posts 48. Each of the beams 46 and posts 48 have a substantially square cross-sectional profile shape and define respective elongate slots (a representative few of which are identified by reference numerals 46a, 48a, respectively) in each of its side surfaces. The opposed side edges 42b of each tooling unit 42 may thus be fixedly attached to the upper facing slots 46a of corresponding opposed parallel profiled beams 46 associated with the upper support subframe 44a.

Rigid interconnection of the beams and posts 46, 48, respectively, are accomplished by means of a series of 90° corner brackets 50 which are secured removably to respective ones of adjacent beams and posts 46 and 48, respectively, by means of a threaded T-head bolt 50a and associated flanged nut 50b assembly. The T-head of the bolt 50a is thus positioned within a corresponding slot 46a, 48a of a respective beam 46 or post 48 with the bolt extending through one of the flanges of the corner bracket 50 so that the flanged nut 50b can then be removably threaded thereon and tightened to a specified torque. In such a manner, therefore, the assembly of the beams 46 and posts 48 will provide a rigid metal external support structure to the additively manufactured thermoplastic tooling units 42. The upper subframe 44a is thus rigidly mounted adjacent to the inner side surfaces of the posts 48 while the lower subframe 44b is rigidly mounted adjacent to the outer side surfaces of the posts 48. As such, the upper subframe 44a is concentrically positioned in vertical spaced relationship to the lower subframe 44b. Similar T-headed bolts 50a and associated flanged nuts 50b may be employed to mount the tooling units 42 to the upwardly facing slots 46a associated with the beams 46 of the upper support frame 44.

Figure 8A:
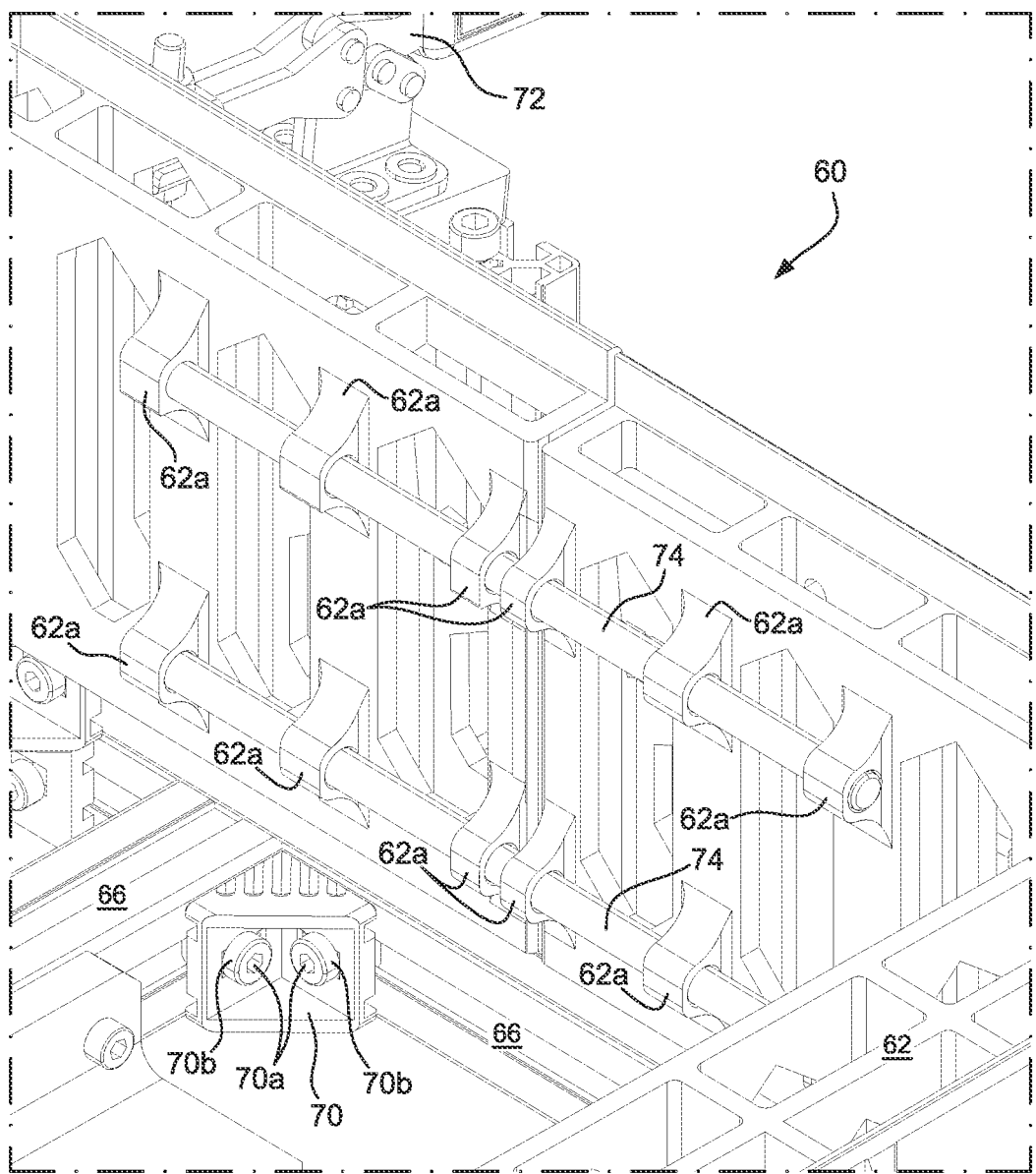
FIG. 8A is an enlarged perspective view of a portion of the tooling structure shown in FIG. 8.

FIGS. 7-8A depict yet another embodiment of an exemplary hybrid tooling structure 60 in accordance with the invention. As is shown, the hybrid tooling structure 60, like the tooling structure 50 discussed previously, is provided with an additively manufactured thermoplastic tooling unit 62 that is mounted to a modular metal support frame assembly 64. The modular metal support frame assembly 64 is comprised of a number of rigid metal profiled beams 66 assembled to one another so as to form generally disposed upper and lower support subframes 64a, 64b that are vertically separated from one another by similarly configured rigid metal support posts 68. Each of the beams 66 and posts 68 have a substantially square cross-sectional profile shape and define respective elongate slots (a representative few of which are identified by reference numerals 66a, 68a, respectively) in each of its side surfaces.

Rigid interconnection of the beams and posts 66, 68, respectively, are accomplished by means of a series of 90° Corner brackets 70 which are removably secured to respective ones of adjacent beams and posts 66 and 68, respectively, by means of a threaded T-head bolt 70a and associated flanged nut 70b assembly. The T-head of the bolt 70a is thus positioned within a corresponding slot 66a, 68a of a respective beam 66 or post 68 with the bolt extending through one of the flanges of the corner bracket 70 so that the flanged nut 70b can then be removably threaded thereon and tightened to a specified torque. In such a manner, therefore, the assembly of the beams 66 and posts 68 will provide a rigid metal external support structure to the additively manufactured thermoplastic tooling unit 62.

The tooling unit 62 is formed of multiple additively manufactured sections that are immovably secured to the upper support subframe 64a by means of clamp members 72. In order to provide additional structural support for the additively manufactured tooling unit 62, adjacent sections thereof may be provided in the additive manufacturing process with apertured bosses 62a that are aligned when the section of the additively manufactured thermoplastic tooling unit 62 is assembled so as to receive therein a rigid metal support rod 74 therein (see FIGS. 8 and 8A). The support rods 74 thereby provide additional support in joining adjacent sections of the tooling unit 62 onto the upper subframe 64a. Handles 76 may also be secured to the beams 66 of the lower subframe 64b via an assembly of T-head bolts 70a and flanged nuts 70b to allow manual handling and transport of the tooling structure 60.

Figure 9:
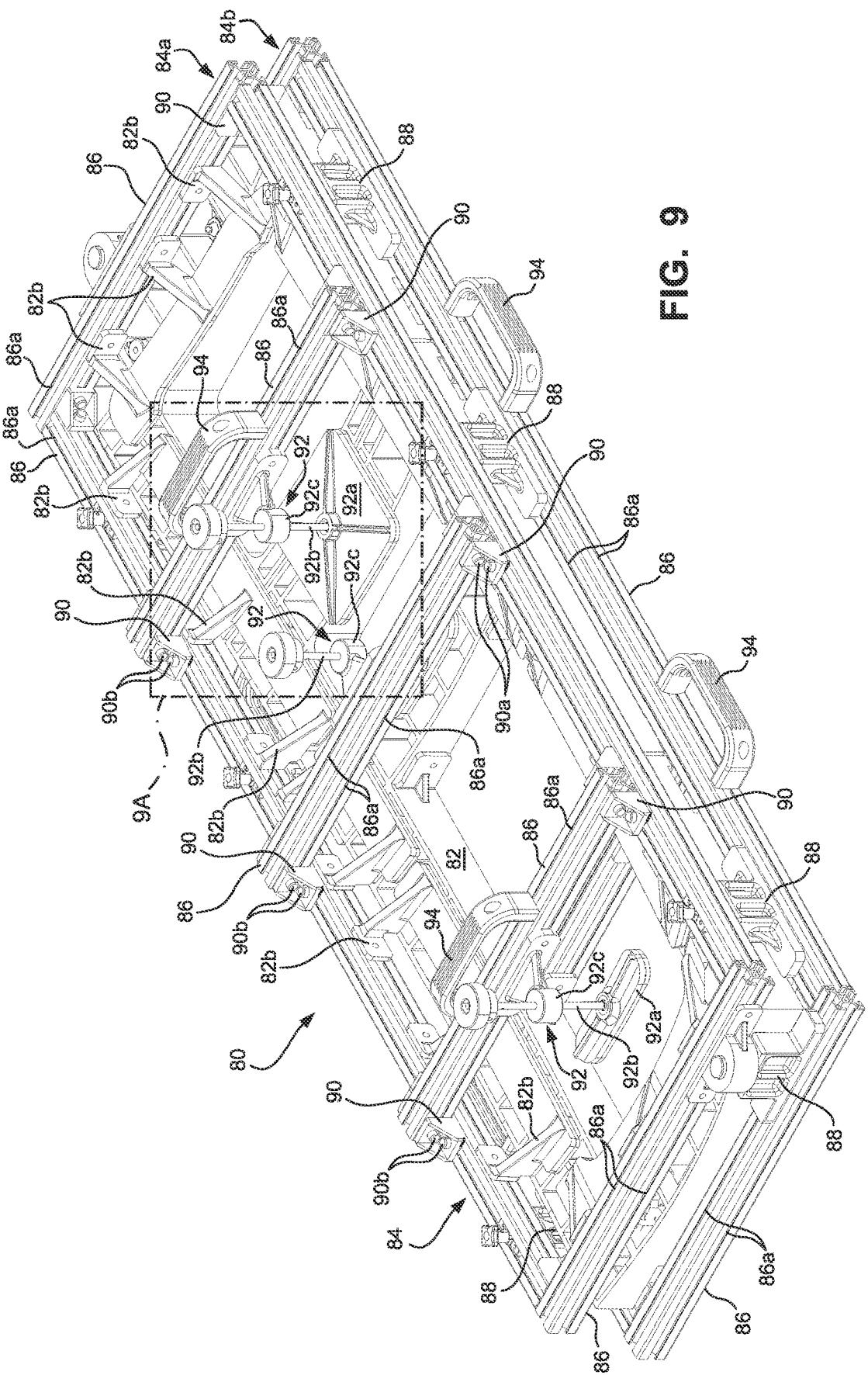
FIG. 9 is a front end perspective as viewed from above of yet another embodiment of an exemplary hybrid tooling structure according to the invention.
Figure 9A:
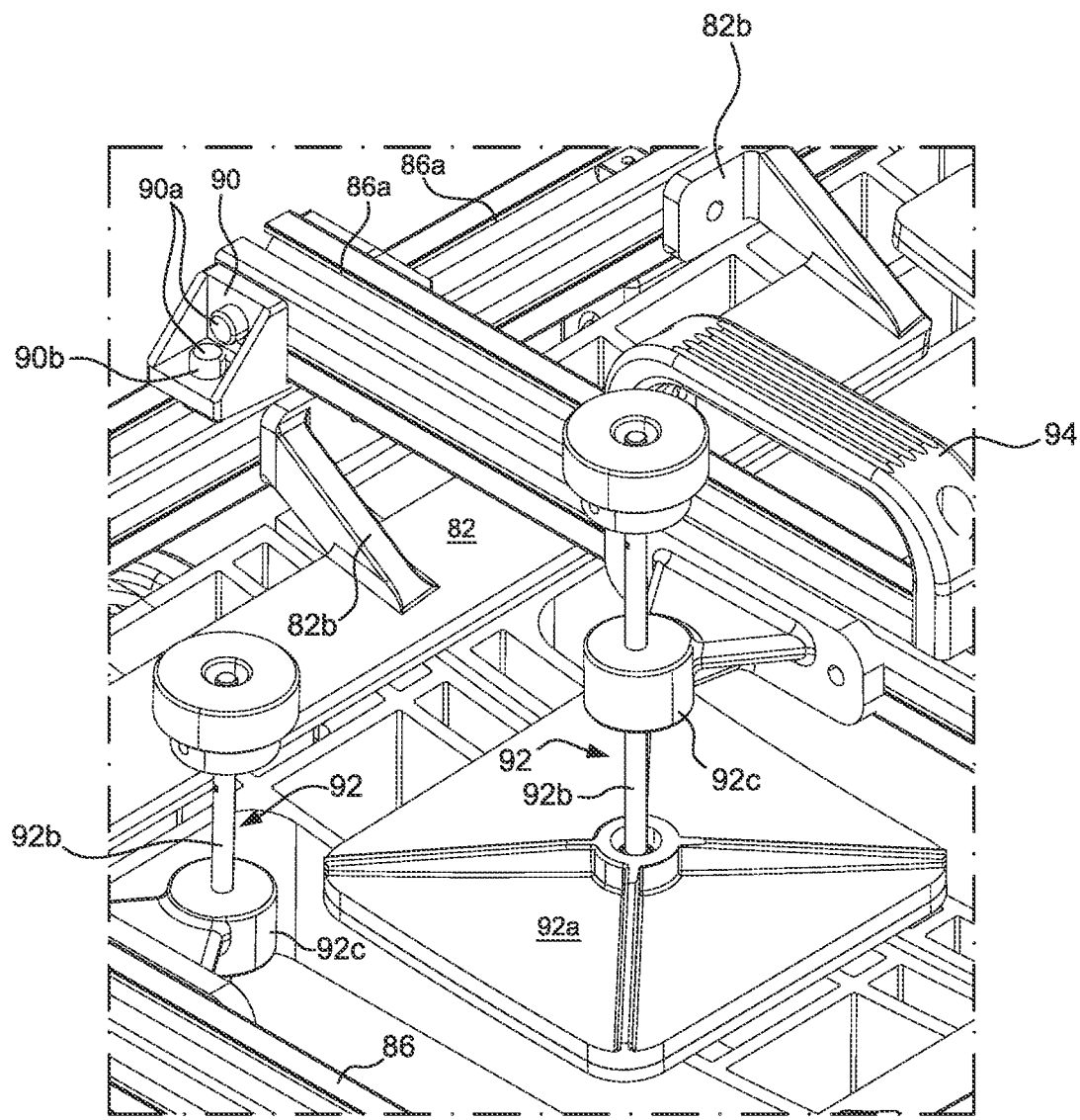
FIG. 9A is an enlarged perspective view of exemplary modular components employed in the tooling structure shown in FIG. 9.
Figure 10:
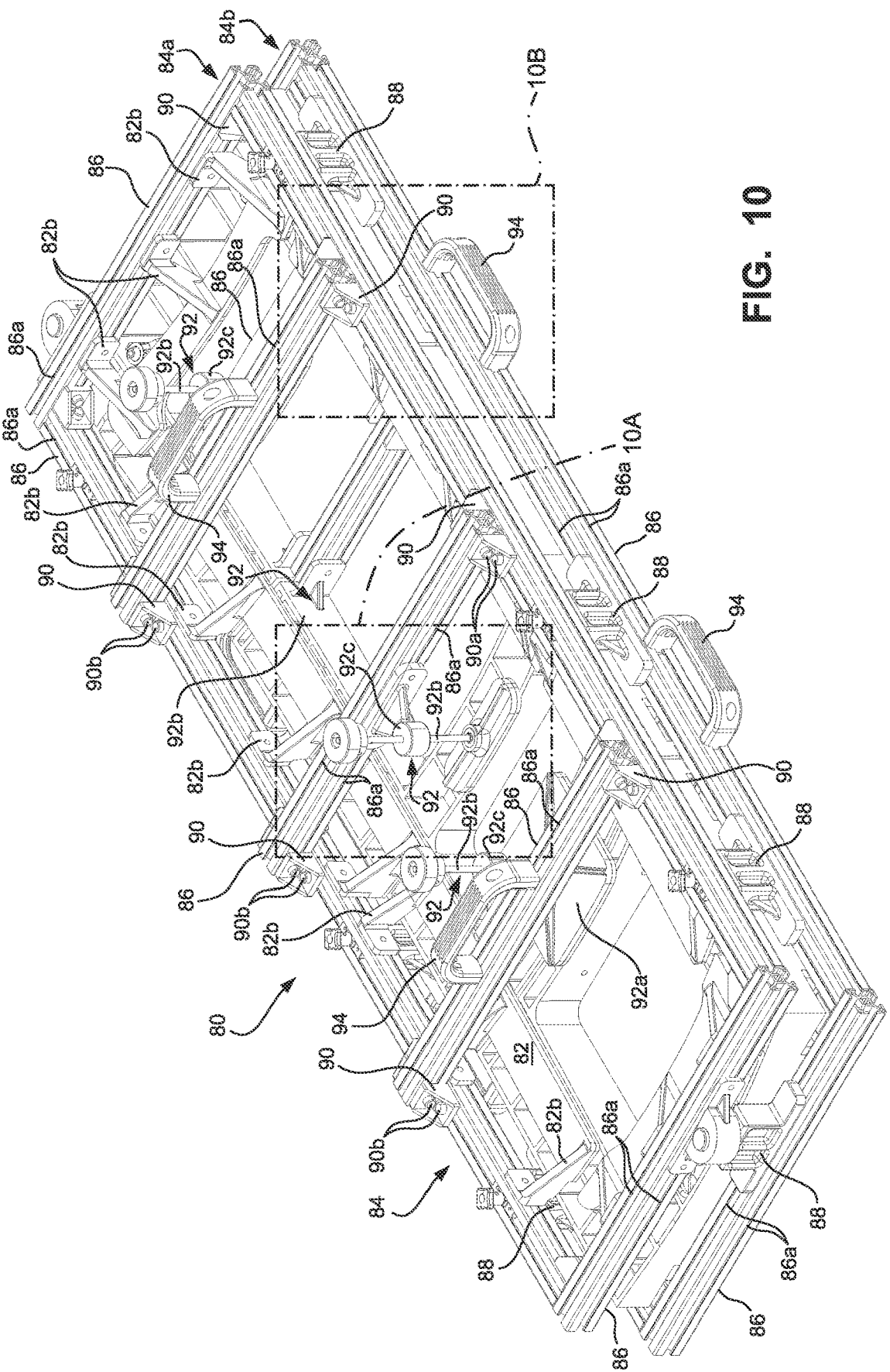
FIG. 10 is a rear end perspective as viewed from above of the tooling structure embodiment shown in FIG. 9.
Figure 10A:
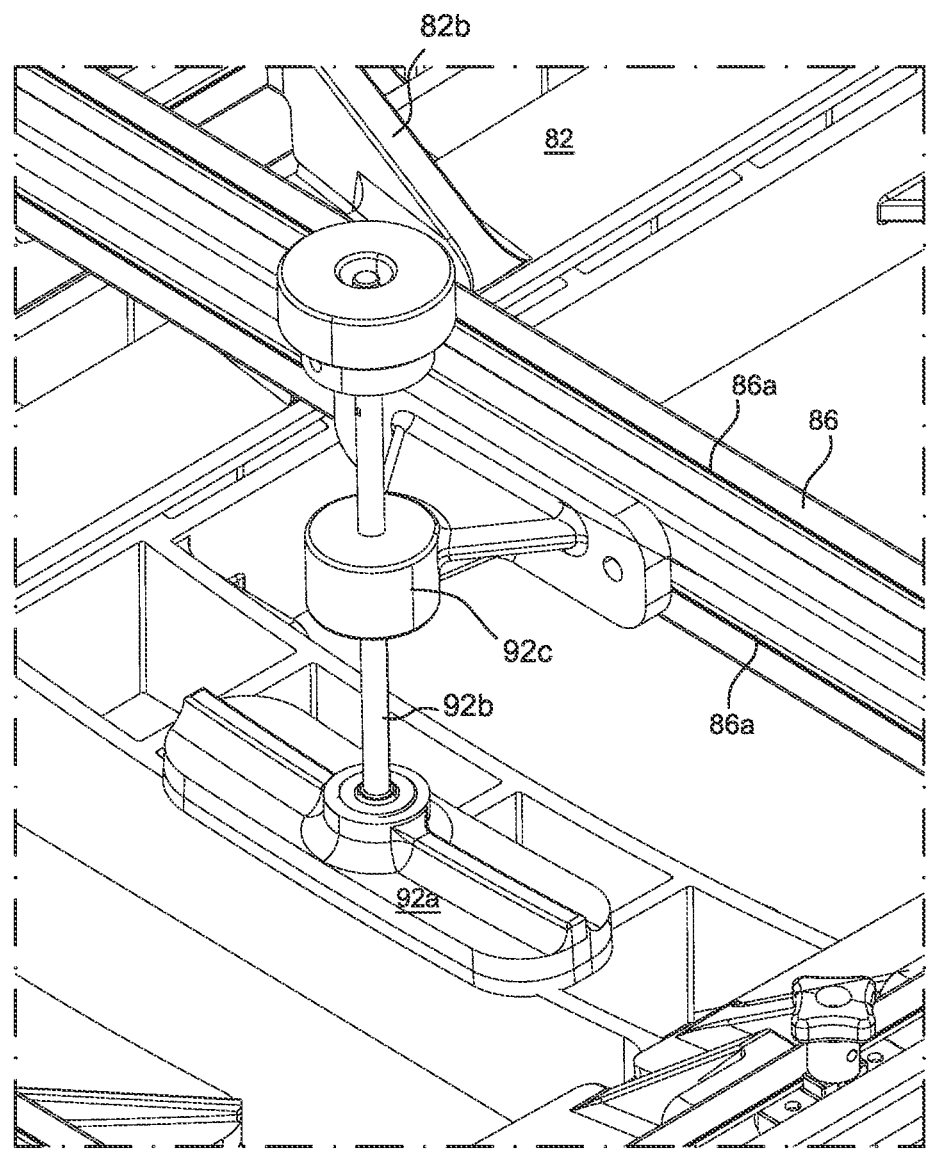
FIGS. 10A and 10B enlarged perspective view of exemplary modular components employed in the tooling structure shown in FIG. 10.
Figure 10B:
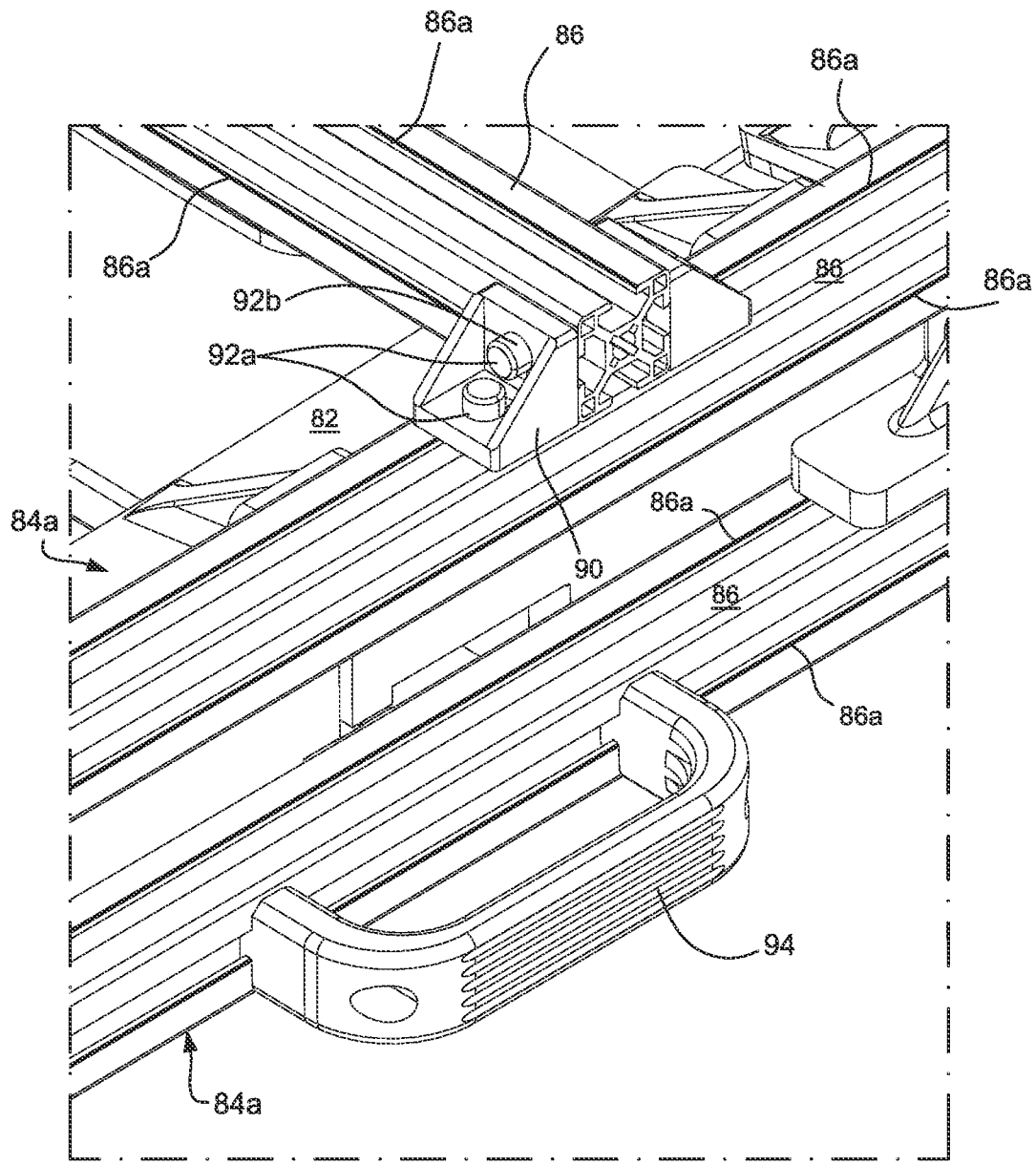

FIGS. 9-10BA depict yet another embodiment of an exemplary hybrid tooling structure 80 in accordance with the invention. As is shown, the hybrid tooling structure 80, like the tooling structure 60 discussed previously, is provided with an additively manufactured thermoplastic tooling unit 82 that is mounted to a modular metal support frame assembly 84. The modular metal support frame assembly 84 is comprised of a number of rigid metal profiled beams 86 assembled to one another so as to form generally disposed upper and lower support subframes 84a, 84b that are vertically separated from one another by rigid metal spacer members 88. The beams 86 have a substantially square cross-sectional profile shape and define elongate slots (a representative few of which are identified by reference numerals 86a) in each of its side surfaces.

Rigid interconnection of the beams 86 is accomplished by means of a series of 90° Corner brackets 90 which are removably secured to respective ones of adjacent beams 86 by means of a threaded T-head bolt 90a and associated flanged nut 90b assembly. The T-head of the bolt 90a is thus positioned within a corresponding slot 86a of a respective beam 86 with the bolt extending through one of the flanges of the corner bracket 90 so that the flanged nut 90b can then be removably threaded thereon and tightened to a specified torque. In such a manner, therefore, the assembly of the beams 86 will provide a rigid metal external support structure to the additively manufactured thermoplastic tooling unit 82. The spacer members 88 as similarly mounted to the slots 86a of the beams 86 so as to provide separation of the subframes 84a, 84b, The additively manufactured tooling unit 82 defines a contoured tooling surface 82a on which a conformably configured component part (not shown) may be positioned and supported thereby. The tooling unit 82 will be provided with a number of unitary additively manufactured mounting flanges 82b that may be secured to adjacent slots 86a of the beams 86 associated with the upper subframe 84a by means of respective assemblies of threaded T-head bolts 90a and associated flanged nuts 90b. A number of clamp assemblies 92 having a clamp foot 92a attached to a terminal end of a threaded clamp shaft 92b may be provided so as to exert clamping pressure onto the component part (not shown) supported by the tooling surface 82a of the tooling unit 82. The threaded clamp shaft 92b may thus be threadably engaged with a threaded support 92c attached to respective slots 86a of adjacent beams 86 via respective assemblies of threaded T-head bolts 90a and associated flanged nuts 90b. Thus respective turning movement applied to the threaded shafts 92b may cause the clamping force of the clamp fort 92a to be increased/decreased as may be necessary to secure the component part (not shown) on the hybrid tooling structure 80. Handles 94 may also be secured to the beams 86 of the upper and/or lower subframes 84a, 84b, respectively, via an assembly of T-head bolts 90a and flanged nuts 90b to allow manual handling and transport of the tooling structure 80.

While reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. A hybrid tooling structure comprising:
   a rigid metal support member which comprises interconnected modular rigid elongate beams to provide a rigid support frame assembly which includes:
   (i) horizontally disposed parallel upper and lower subframe assemblies formed by an interconnected plurality of the elongate support beams, and
   (ii) a plurality of upright rigid metal support posts connected to the upper and lower subframe assemblies so that the upper subframe assembly is vertically separated from the lower subframe assembly; and
   a plurality of one-piece tooling units each having unitary body portion defining a tooling surface and formed of a fused deposition molded thermoplastic material, the one-piece tooling units being removably fixed to the horizontally disposed upper subframe assembly of the rigid support frame assembly, wherein
   each of the support beams and posts has a rectangular cross-section and defines elongate slots in each side surface thereof, and wherein the upper and lower subframe assemblies further comprise:
   (i) a plurality of corner brackets, and
   (ii) a plurality of T-head bolt and flanged nut assemblies, wherein
   (iii) each T-head bolt of predetermined ones of the T-head bolt and flanged nut assemblies is operatively received with a corresponding slot of a respective support beam with a threaded shaft thereof extending through an aperture of a respective one of the corner brackets, and wherein
   (iv) each flanged nut of the T-head bolt and flanged nut assemblies is threadably coupled to the threaded shaft of a respective T-head bolt so as to rigidly connect a respective one of the corner brackets to a respective one of the support beams and/or support posts, and wherein
   (v) the upper and lower subframes are rigidly connected by respective ones of the corner brackets and the T-head bolt and flanged nut assemblies such that the upper subframe is adjacent an inner side surface of the support posts and the lower subframe is adjacent an outer side surface of the support posts such that the upper and lower subframes are in a concentric and vertically separated relationship.

2. The hybrid tooling structure according to claim 1, wherein each of the tooling units is formed of an additively manufactured tooling unit part, and wherein
   each of the multiple additively manufactured tooling parts is positionally fixed to upwardly facing ones of the elongate slots associated with respective ones of the horizontally disposed upper subframe assembly by T-head bolts of selected ones of the T-head bolt and flanged nut assemblies being received within the upwardly facing slots.

3. The hybrid tooling structure according to claim 2, wherein the upper subframe assembly further comprises a plurality of clamp members to respectively clamp the multiple tooling unit parts to the upper subframe assembly.

4. The hybrid tooling structure according to claim 2, wherein an adjacent set of the one-piece tooling unit parts comprises:
   unitary bosses each defining an aperture aligned with the apertures of adjacent ones of the bosses, and wherein the hybrid tooling structure further comprises a support rod inserted through the aligned apertures of the bosses.

5. The hybrid tooling structure according to claim 1, wherein at least one of the upper and lower subframe assemblies comprises at least one handle.

6. The hybrid tooling structure according to claim 1, wherein the upper subframe assembly comprises at least one clamp assembly to clamp a component part onto the contoured tooling surface of the tooling unit.

7. The hybrid tooling structure according to claim 6, wherein the at least one clamping assembly comprises:
   a threaded support connected to a support beam of the upper support frame subassembly,
   a threaded shaft threadably connected to the threaded support, and
   a clamp foot at a terminal end of the threaded shaft to apply clamping pressure against the component part.

8. The hybrid tooling structure according to claim 6 comprising a plurality of the clamping assemblies.

9. A method of fabricating a component part comprising the steps of:
   (a) providing the hybrid tooling structure according to claim 1;
   (b) associating preforms of the component part with the tooling surfaces of respective ones of the tooling units; and
   (c) subjecting the preforms of the component part to processing while (c) associated with the tooling units.

10. The method according to claim 9, wherein
    step (b) comprises laying up a successive number of layers of a prepreg material comprised of a fiber-reinforced curable resin to form each of the preforms of the component part from the prepreg material, and wherein step (c) comprises subjecting the preforms of the component part to resin curing conditions.

11. The method according to claim 10, wherein step (c) comprises subjecting the preforms of the component part to elevated temperature and pressure conditions within an autoclave.

12. The method according to claim 10, wherein step (c) comprises subjecting the preforms of the component part to low or room temperature and ambient atmospheric pressure conditions sufficient to cure the resin of the prepreg material.

* * * * *